United States Patent [19]

Bethel et al.

[11] 4,446,336

[45] May 1, 1984

[54] METHOD FOR RECORDING AND UPDATING STORED MESSAGES IN AN ANNOUNCEMENT SYSTEM

[75] Inventors: Leslie D. Bethel, Naperville; Howard A. Kerr, West Chicago; Frances B. Strebendt, Wheaton, all of Ill.; John E. Waninski, Jr., Red Bank, N.J.

[73] Assignee: Bell Telephone Laboratories, Incorporated, Murray Hill, N.J.

[21] Appl. No.: 233,001

[22] Filed: Feb. 9, 1981

[51] Int. Cl.³ .................... H04M 1/64; H04M 1/66
[52] U.S. Cl. .................................. 179/6.10; 179/6.17
[58] Field of Search ............... 179/6.1, 6.17, 6.2, 179/18 B, 18 D, 18 DA, 2 CA, 2 A, 27 FG, 27 FH; 360/12; 340/825.31, 825.33, 825.34, 825.35, 825.54, 825.55, 825.25; 364/200, 900

[56] References Cited

U.S. PATENT DOCUMENTS

| | | | |
|---|---|---|---|
| 3,022,380 | 2/1962 | Miller et al. | 179/6.1 |
| 3,403,383 | 9/1968 | Kienzle et al. | 179/6.17 |
| 3,684,834 | 8/1972 | Bryant, Jr. | 179/6.1 |
| 4,065,642 | 12/1977 | McClure | 179/18 B |
| 4,154,988 | 5/1979 | Fechalos et al. | 179/18 B |
| 4,306,117 | 12/1981 | Jacobson | 179/6.1 |

OTHER PUBLICATIONS

Hanson et al., "New Custom Calling Services", Bell Laboratories Record, Jun. 1980, vol. 58, No. 6, pp. 174–180.

Primary Examiner—Donald E. McElheny, Jr.
Attorney, Agent, or Firm—C. H. Davis

[57] ABSTRACT

A telephone switching office is disclosed having a public announcement system wherein new announcements can be recorded or priorly recorded announcements can be updated via the telephone network. The producer dials a number associated with the announcement to be updated and transmits the update announcement to the office. In order to verify the announcement with an authorized party, the switching office calls the producer at a preassigned station and plays back the update announcement. If the producer disconnects before the playback is completed, the playback announcement is aborted; otherwise, the new version is made active and the former announcement is removed from service.

7 Claims, 10 Drawing Figures

FIG. 7
DIRECT PRODUCER UPDATE

FIG. 9
CALLBACK TO PRODUCER

FIG. 10
CALLBACK TO PRODUCER

METHOD FOR RECORDING AND UPDATING STORED MESSAGES IN AN ANNOUNCEMENT SYSTEM

TECHNICAL FIELD

This invention relates to communication systems and particularly to systems for distributing and broadcasting announcements individually to a large number of people. In a more particular aspect, this invention relates to telephone communication systems, and particularly to arrangements for transmitting prerecorded messages over a telephone communications network to telephone customers. In a still more particular aspect, this invention relates to methods and apparatus for managing and updating prerecorded messages in a public announcement system.

BACKGROUND OF THE INVENTION

The telephone network has long been utilized as a medium for broadcasting messages of general interest to telephone customers. Thus, customers can dial preassigned directory numbers to receive recorded information such as weather reports, stock quotations, the time-of-day, scores of sporting events, etc. If the recorded announcements are in the nature of a public service such as weather reports, time-of-day, etc., and are under control of the telephone company, measures can be taken to safeguard the announcement system so that unauthorized messages are not inadvertently broadcast over the network. Thus, any changes in announcements would be permitted only by authorized telephone company personnel who have access to the announcement equipment.

The announcement service, however, may also be offered to subscribers who wish to broadcast announcements of a more commercial nature such as stock quotations, promotional advertisements, and the like. With this service, it is desirable to permit an authorized subscriber (referred to herein as a producer) to make changes in his announcements by calling directly over the regular telephone network.

There are known systems which employ safety measures to preclude unauthorized announcements and yet permit a producer to make announcement changes over the network from a telephone station. With these arrangements, the producer can dial a special access code from a station to gain access to the announcement system. Once gaining access to the system, the producer dials special unlocking codes in order to update a particular announcement. After the new announcement has been recorded, the announcement is played back over the same telephone connection to permit the producer to verify the message for correctness and transmission quality. While certain safeguards are employed in these arrangements, it is obvious that anyone having knowledge of the unlocking and access codes can change announcements at will without the producer's permission. Thus, an unauthorized person could replace a legitimate announcement with material that is objectionable or detrimental to the producer.

SUMMARY OF THE INVENTION

The foregoing problem is solved and a technical advance is achieved by an announcement system which is arranged to verify message updates only to the producer subscribing for the particular announcement service. More specifically, when a producer wishes to update a prerecorded message, the producer originates a call over the telephone network to the announcement system by dialing special codes which access the system and identify the producer. Once connected to the announcement system, the producer enters a new message to be recorded therein for future broadcasting. After the message has been recorded, the switching system originates a special call to a predesignated telephone that has been assigned to the producer. When the producer answers, the message is played back for verification. If the producer wishes to reject the message, he hangs up before the switching office disconnects, and the announcement system removes the new message from its file. If the producer does not hang up before the switching system disconnects, the message is thereby verified and retained by the announcement system which will put the announcement in an active state according to the time designated by the producer.

DETAILED DESCRIPTION

Figure 1:
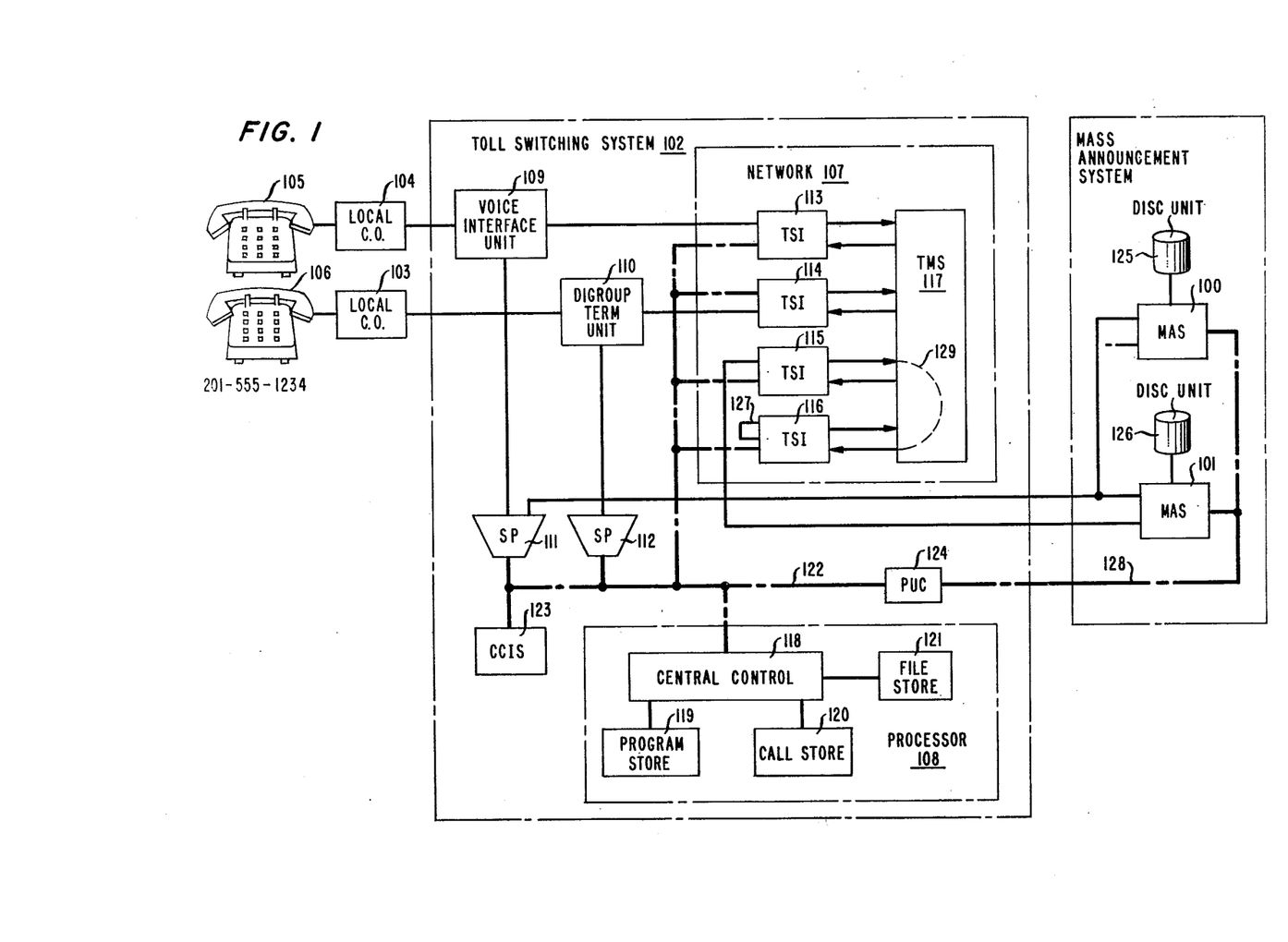
FIG. 1 shows, in block diagram form, a telephone network having a toll switching system equipped with a public announcement system.

The general system organization is illustrated in the block diagram of FIG. 1 which shows a typical communications network having a toll switching system 102 which serves local telephone central offices 103 and 104. Central offices 103 and 104 contain the switching apparatus for providing telephone service to customer stations 105 and 106 respectively. Connected to switching system 102 is a public announcement system comprising mass announcement units MAS 100 and MAS 101. The mass announcement units are used for broadcasting prerecorded messages over the telephone network via the toll and local switching offices.

Toll switching system 102, as depicted in FIG. 1, is a typical electronic switching system such as the No. 4 ESS which is manufactured by Western Electric Company, Incorporated. This switching system is described in detail in *Bell System Technical Journal*, Vol. 56, No. 7, September, 1977, and need not be fully described herein for the reader to understand the present invention.

Switching system 102 comprises a network 107, a processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113-116 and time multiplex switch (TMS) unit 117.

TMS 117 is a two-stage switch array comprised of solid state crosspoints which provide a multiplicity of unidirectional paths between its input and output. Each network connection through TMS 117 is made in terms of a pair of unidirectional paths in one of the 128 time slots sharing the paths on a repeating basis at an 8 KHz rate. The switches are controlled by information contained in time slot memories and this information is placed in the memory by the processor under the control of call processing programs.

The TSI units 113–116 provide the initial time-space and final space-time stages of the network 107. The time slot interchanger receives incoming pulse code modulated samples over analog and digital facilities in a DS-120 format where 120, 8 bit PCM channels are multiplexed with 8 maintenance channels to form a 128 time slot frame. The receiving portion of the time slot interchanger buffers the incoming links to allow synchronization of the data with the network timing and performs the initial time-space switching before transmitting data to the TMS. After passing through the TMS, the data is returned to the same TSI or another TSI where the final space-to-time conversion is performed. The TSI then reloads the data on to outgoing DS-120 links where it is transmitted to the appropriate analog or digital facility.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 104 is connected to the toll office over the digital facilities which terminates in digroup terminal unit 110, while local office 103 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formating digital data for the TSI units. Voice interface unit 109 communicates with the central control via signal processor 111.

Signal processor 111 is a directed processor under the control of central control 118 and provides the scan, distribute, and digit reception tasks for analog trunks. Signal processor 112 performs the equivalent tasks for the digital trunks except that instead of physical scan and distribution points, the supervisory states of each trunk are stored in a memory in a signal processor.

The majority of the logic control storage and translation functions required for the operation of the toll switching system are performed by processor 108. Processor 108 is a data processing facility and can functionally be divided into a central control 118, program store 119, call store 120, file store 121, and other apparatus that has not been shown to simplify the drawing. A typical processor suitable for use in the illustrative toll switching system is described in the *Bell System Technical Journal,* Vol. 56, No. 2, February, 1977.

The program store 119 contains programs that are normally resident in the system while call store 120 contains transient data relating to calls in progress. File store 121 is a source of office data and programs, and store 121 will retain the data in the event of a power or hardware failure. The file store is used to replenish program stores that become faulty and lose their data.

Central control 118 is the information processing unit of the system and executes the program instructions resident in program store 119 using the call processing data in call store 120. Central control 118 communicates with the peripheral units including the announcement system via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A description of a typical common channel interoffice signaling system is disclosed in the *Bell System Technical Journal,* Vol. 57, No. 2, dated February, 1978, and is represented herein by CCIS block 123.

Coupled to the toll switching system is a public announcement system comprising two mass announcement units designated MAS 100 and MAS 101. While only two MAS units are shown to simplify the drawing, it will be obvious to the reader that more units can be provided. Each MAS unit has a disc storage unit associated therewith for the storage of announcements to be broadcast over the network. In the illustrative embodiment, the disc units 125 and 126 are each arranged to store up to 40 minutes of announcement information which is stored in 30 second segments in 64 kilobit serial PCM data format. Except for phase timing and announcement duplication functions, each MAS unit operates independently. Insofar as a MAS unit is concerned, the start of each announcement phase or segment is displaced by 30 seconds in time. However, the two MAS units 100 and 101 together are displaced by 15 seconds in time. The duplication arrangement provides protection in the event of a MAS unit failure, but lengthens the announcement waiting time when one MAS unit fails. Each MAS unit is connected to a serving TSI unit which is connected through the TMS to a dedicated TSI unit. As shown in FIG. 1, MAS unit 101 is connected to the time slot interchange unit 115, and this TSI unit is connected via nailed up connection 129 to TSI unit 116 which is configured by virtue of its "loop back" 127 to fan out announcements from the MAS unit to other TSI's, thus permitting the simultaneous broadcasting of an announcement to numerous customers. In practice both MAS units are connected in a similar manner, and each would be connected to duplicate TSIs for reliability, but this has not been shown to simplify the drawing.

Interaction between the MAS units 100 and 101 and the toll switching system processor 108 is via peripheral unit controller PUC 124 and busses 122 and 128. The MAS units are also connected to signal processor 111 for maintenance purposes.

Figure 2:
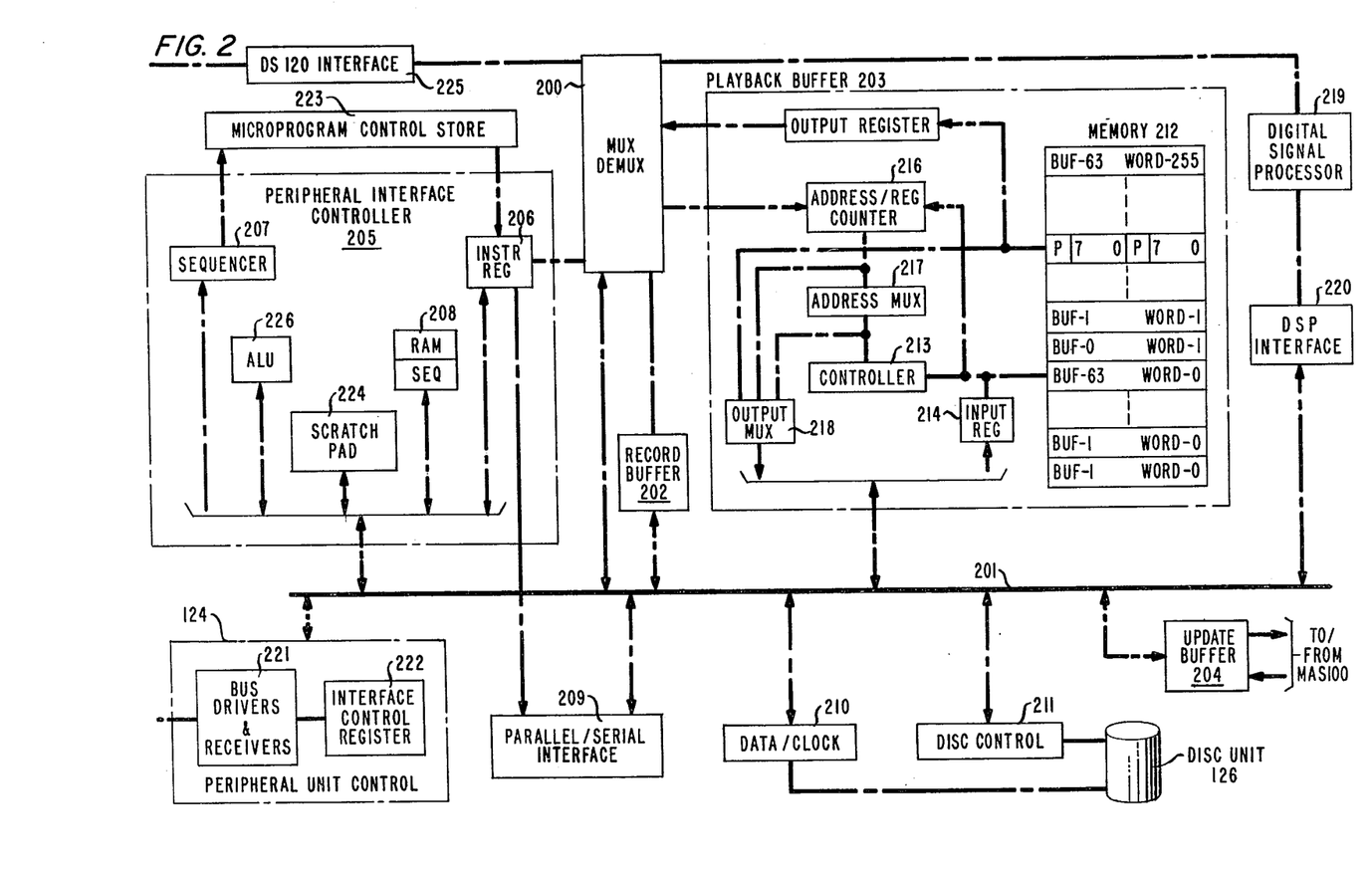
FIG. 2 shows a more detailed block diagram of the public announcement system of FIG. 1.

MAS unit 101 is shown in more detail in the block diagram of FIG. 2. MAS unit 100 is similar and need not be disclosed in detail herein for a full understanding of the invention. MAS unit 101 comprises a data multiplexer/demultiplexer 200, DS-120 interface 225, digital signal processor 219, buffers 202–204, program store 223, peripheral interface controller 205, and a moving head disc 126.

Peripheral interface controller 205 is a high-speed sequencer-driven controller which performs all common arithmetic and logic for control purposes within MAS unit 101. Controller 205 is driven by a firmware program contained in the microprogram control store 223.

Some of the routines performed by controller 205 include the control of all data transferred via internal bus 201, processing orders from the toll switching system processor 108, phasing announcements and generating reports associated therewith, controlling the reading of the mate MAS 100 update buffer during an update process, controlling the moving head disc.

Periodically, the sequencer 207 in controller 205 generates an address to read a word from store 223. This word is read into an instruction register 206 in the controller which executes the instruction. Controller 205 also contains interrupt control logic, a scratch pad register 224, and a random access memory 208.

The RAM provides storage for variable status, control and error information as well as a scratch pad memory for transient data. Some types of information found in the RAM are the temporary storage of disc read/write data, buffer and sector allocation tables of announcements, announcement start and stop data, pointer tables, status and control data, read/write pointers associated with the switching system processor, etc.

MAS 101 contains a bidirectional internal bus 201 which provides the means of communication between the circuits shown in FIG. 2. Data is transferred to and from the bus as addressed by the source and destination codes supplied by instruction register 206.

Sequencer 207 provides the normal sequential program addresses as well as conditional and unconditional branch addresses under direction of function bits contained in register 206.

Announcement storage is provided by moving head disc 126. In the illustrative embodiment, a disc storage unit 126 provides a high-speed random access digital data storage device. The unit employs a disc pack having at least three discs resulting in six storage surfaces. Five of the surfaces are used for storage of announcements, while the sixth is a prerecorded servo and clock surface.

Figure 3:
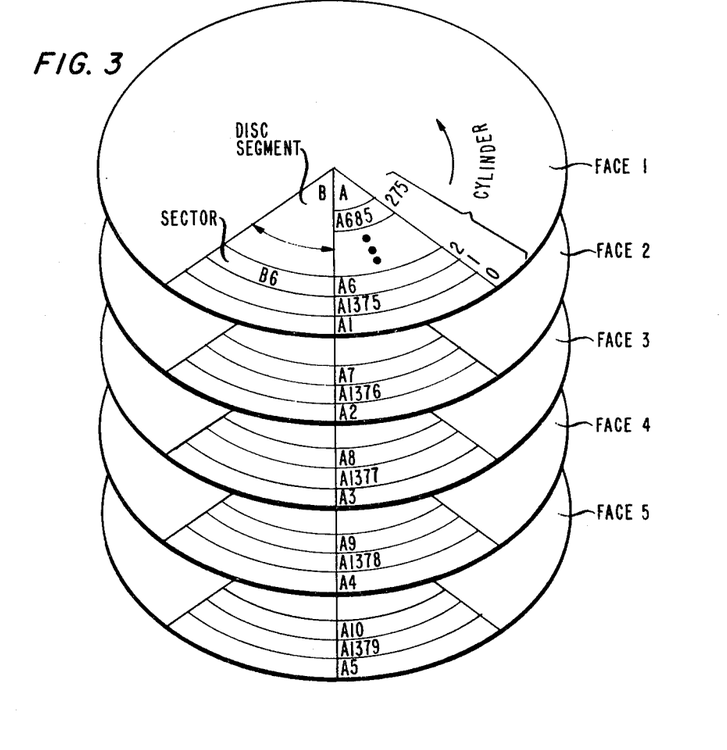
FIG. 3 depicts the disc memory layout for announcements stored in the public announcement system.

The announcements are stored in the manner depicted in FIG. 3 so that a minimum waiting time is experienced before a complete message is available for playback. More specifically, each disc face is divided into annular tracks of which 276 will be used for announcement storage. The annular tracks of all five faces are aligned one above the other and when taken together, form a cylinder. Each track is further divided into 86 sectors. Six are reserved for maintenance, a maximum of 59 can be activated for announcements to be played back, and the remainder are available for standby announcements or recording prior to activation of playback. The contents of all active tracks on all faces of a disc segment comprise one 30-second segment of a message. The disc segments are designated A, B, etc., in FIG. 3.

The disc drive contains five data heads, one for each data face with one data head being activated at a time. The disc is scanned in 30-second cycles, first by accessing all active sectors on track 0 (the outermost track) of each active face in succession (i.e., the scan of one cylinder). The heads are then moved into cylinder 2, and the process is repeated for all even-numbered cylinders until the innermost active cylinder is reached. The direction of head motion is then reversed to scan the odd-numbered cylinders while the heads return to the outer rim.

Thus, with the above arrangement, each MAS unit is always no more than 30 seconds away from the beginning of a message segment. The storage of announcements in the MAS units 100 and 101, however, is offset in time by 15 seconds so that insofar as the total switching system is concerned, the beginning of a message segment is available within 15 seconds, depending on which MAS unit is selected.

The data transfer rate to and from the disc unit and the processor capacity are sufficient to service the record and playback buffers 202 and 203, respectively, and still allow time for controller 205 to execute peripheral orders, file reports with the switching system processor 108, perform diagnostics, etc.

During each 30-second disc scan, the assignment tables that are used to map the disc sectors to the buffers are permuted to cause 30-second strips to be linked to the buffers, thereby providing variable message lengths. In this illustrative embodiment, messages can be provided up to five minutes long in 30-second segments.

Figure 4:
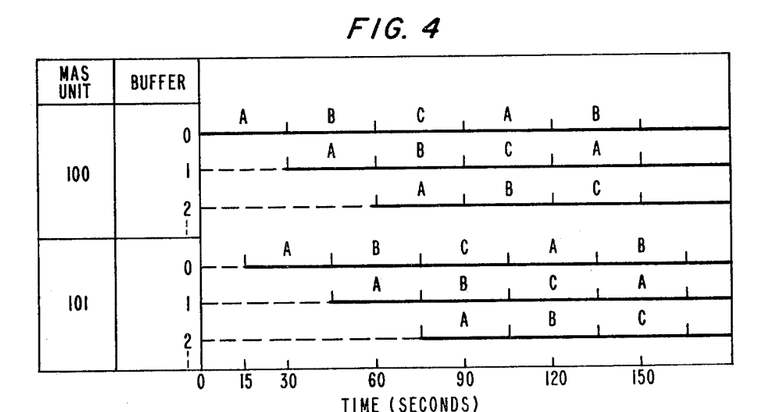
FIG. 4 depicts a timing diagram of the several segments of an announcement and how they are phased within the duplicated announcement system.
Figure 5:
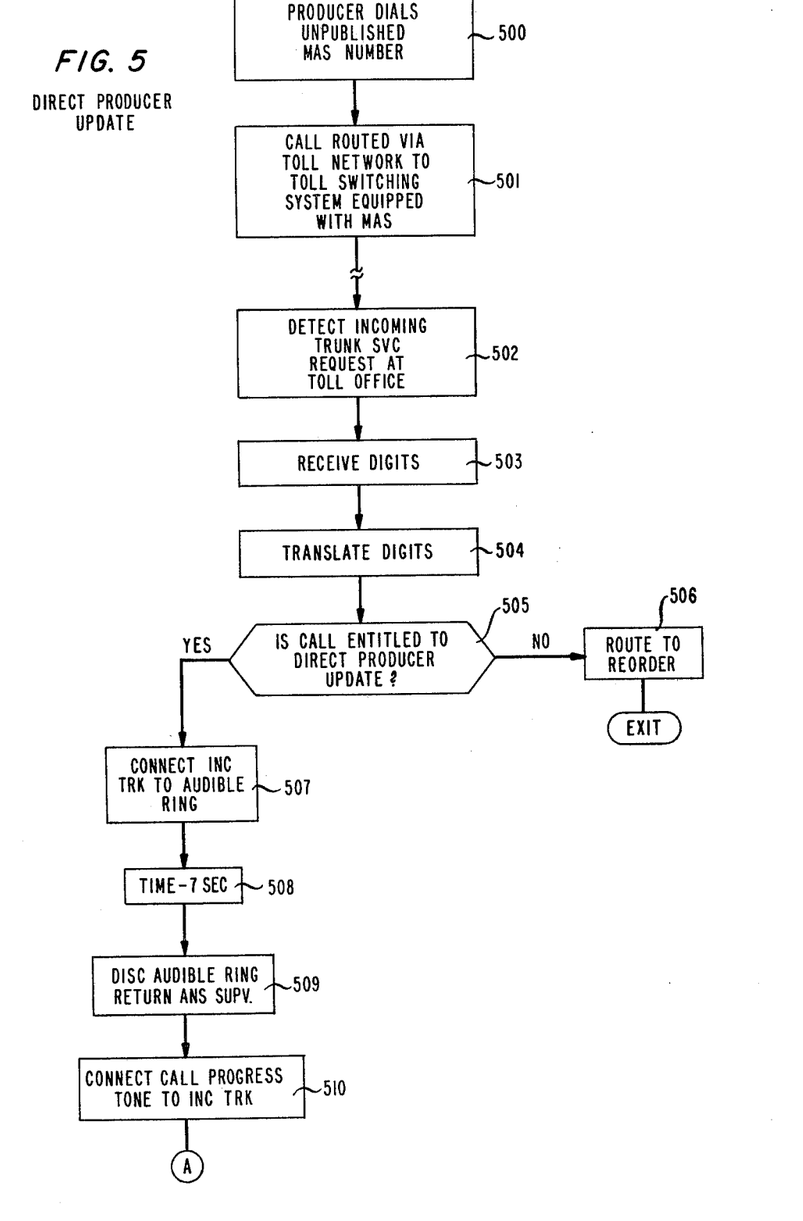
FIGS. 5-8 show a flow diagram depicting the sequence of operations that occur in the system when an announcement is to be updated.
Figure 6:
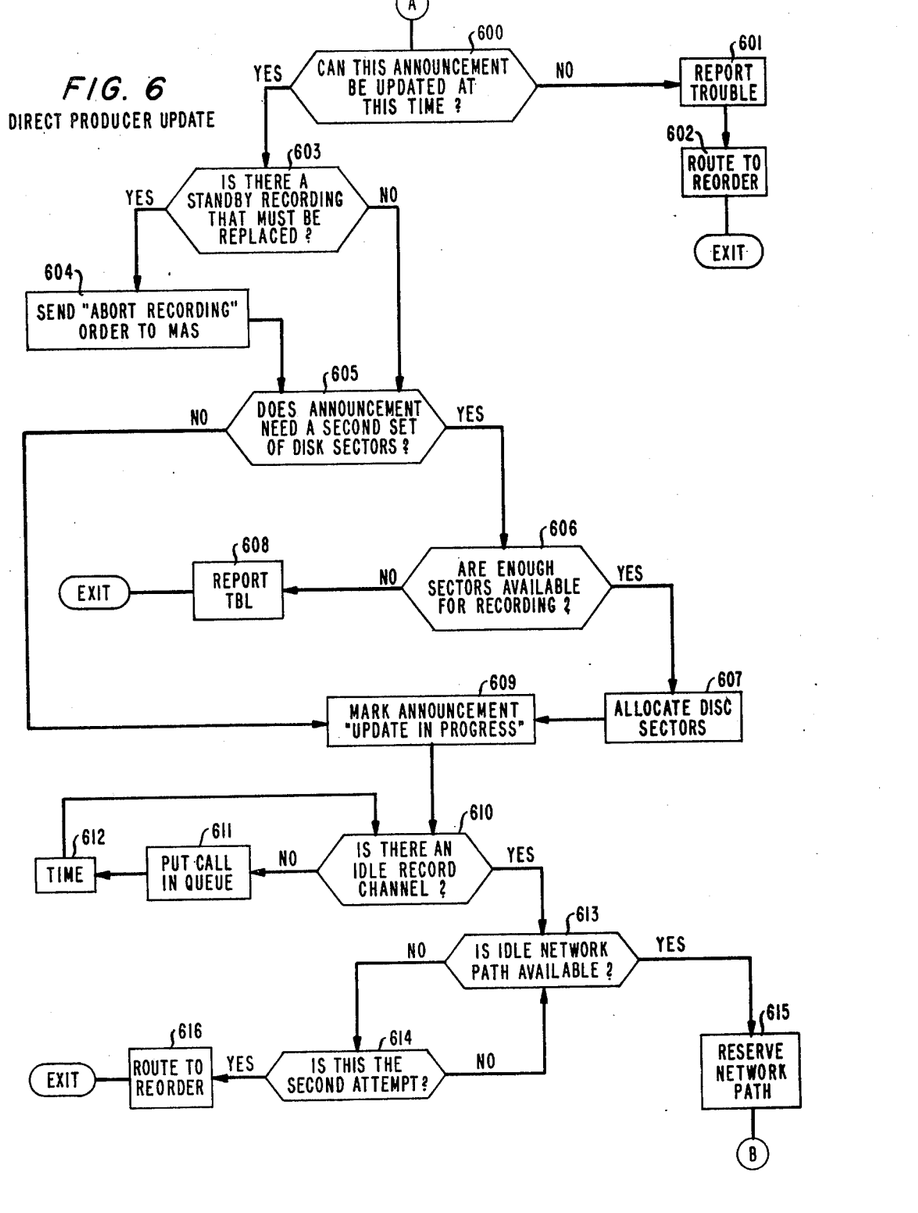
Figure 7:
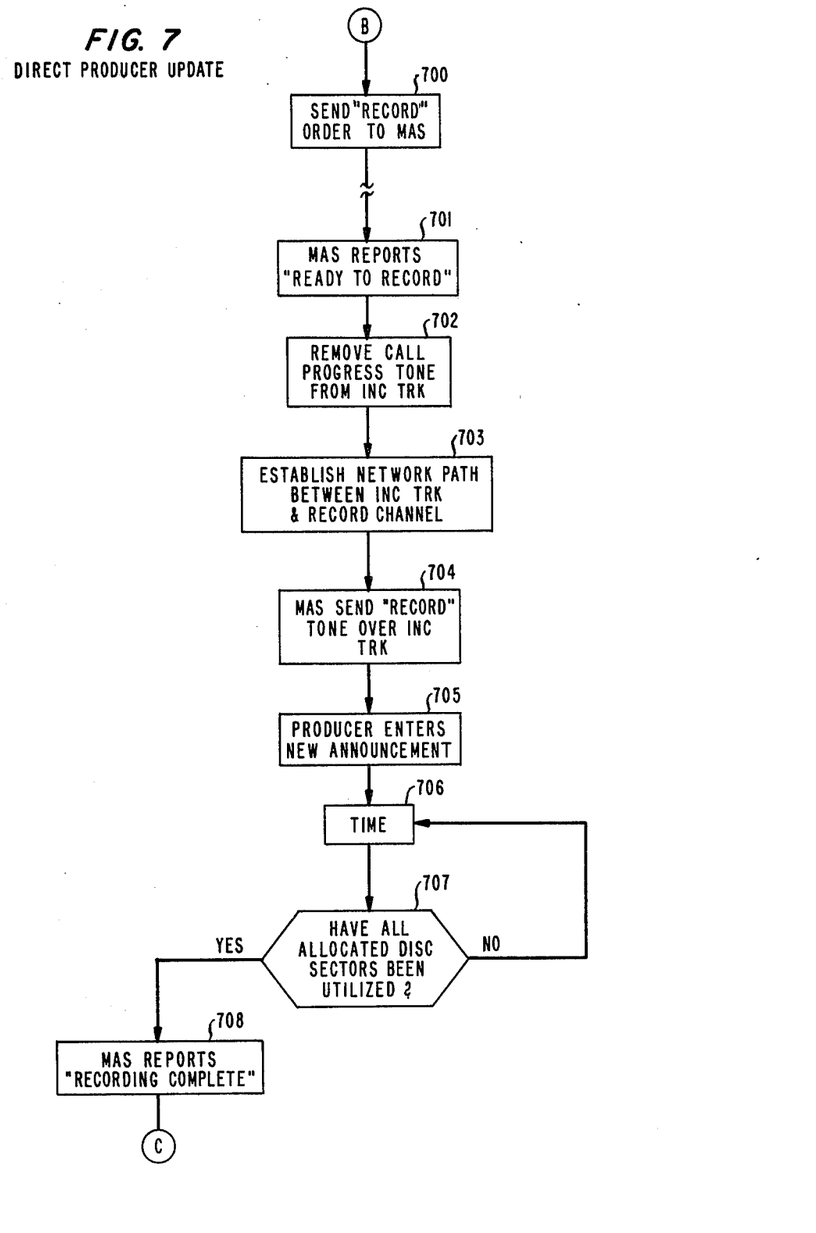
Figure 8:
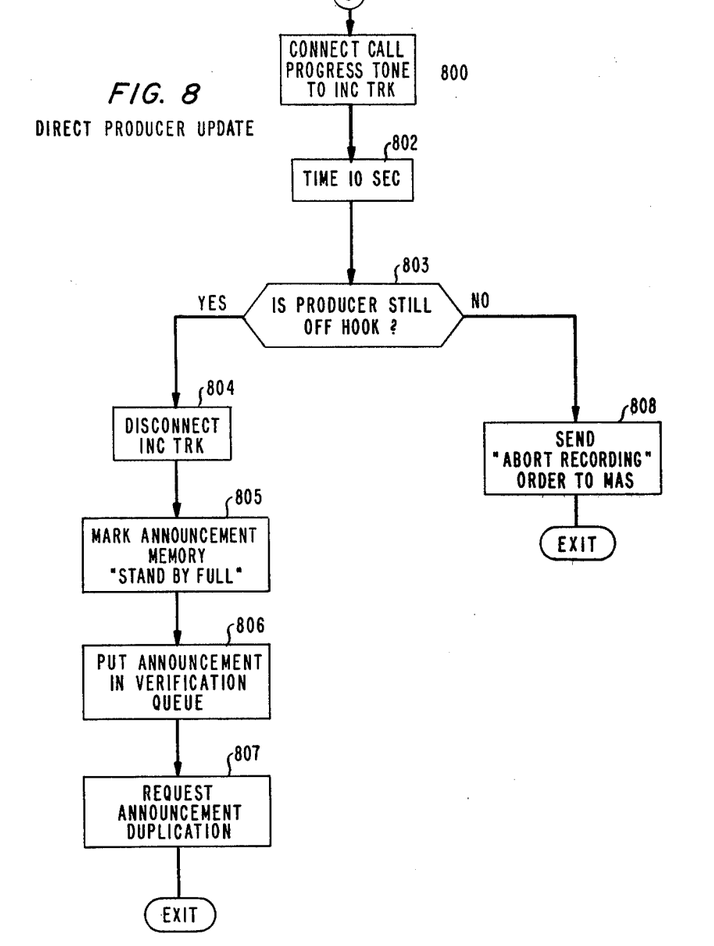
Figure 9:
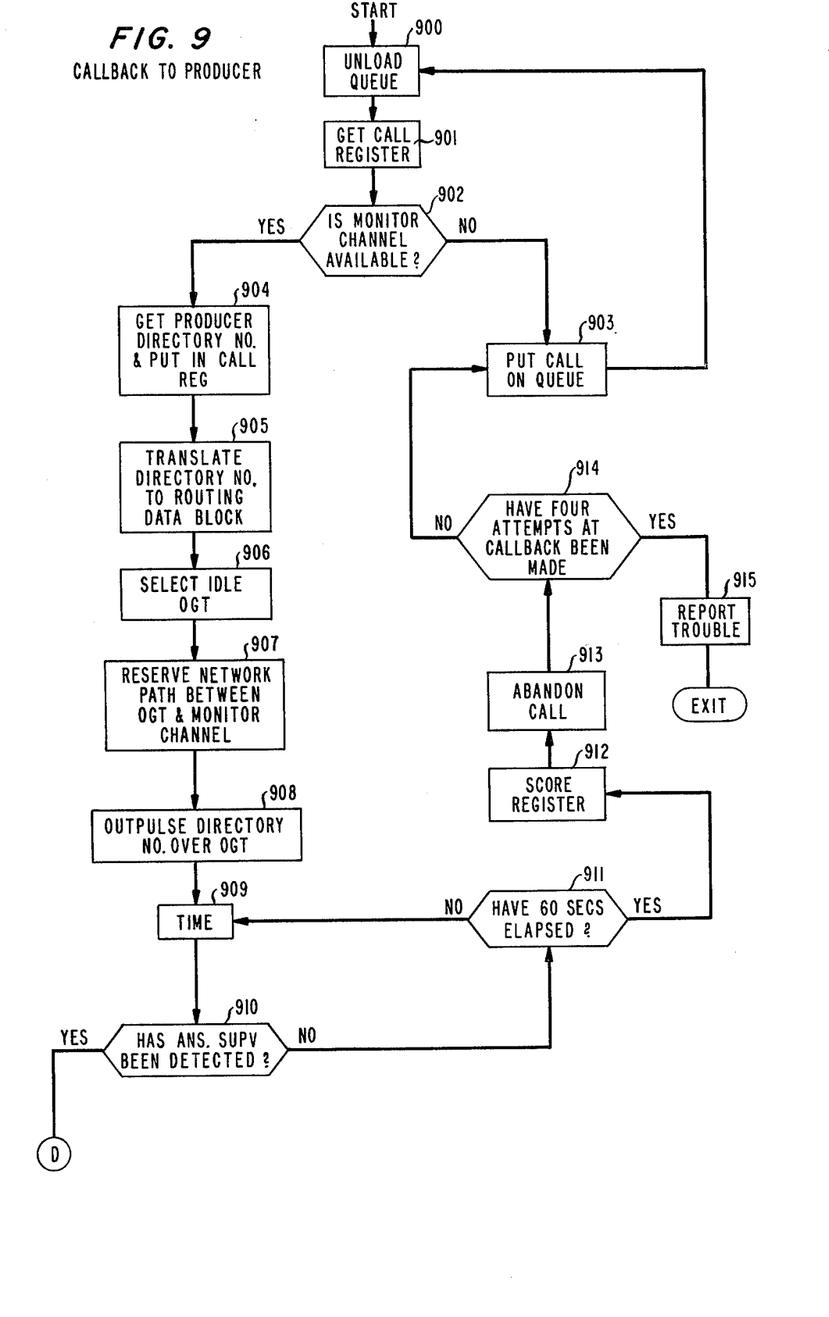
FIGS. 9 and 10 depict the sequence of operations that take place in the system when an announcement is to be verified.
Figure 10:
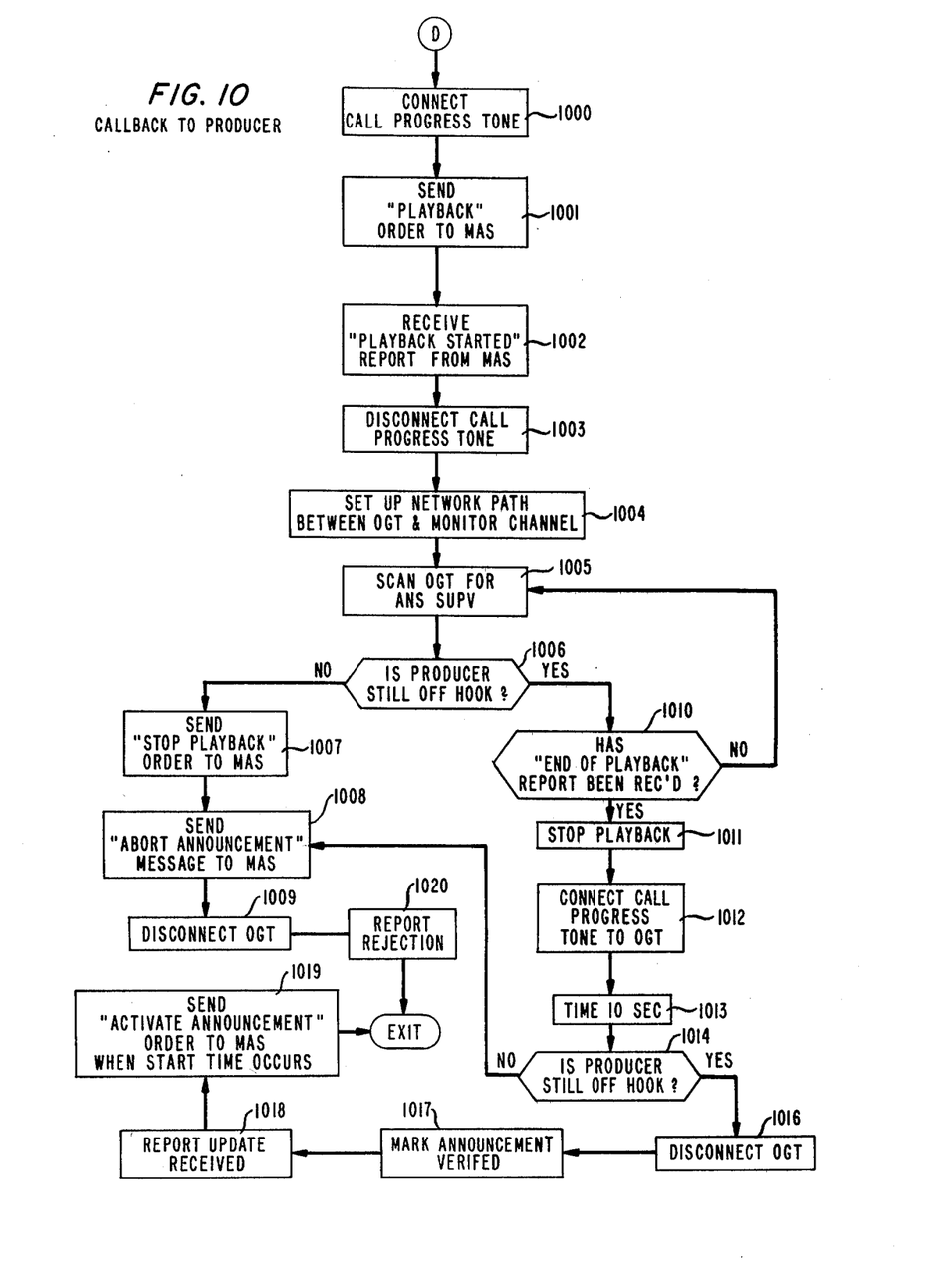

The assignment tables are located in the RAM of controller 205, and FIG. 4 illustrates how the buffers are assigned for a 90-message. The message is divided into three 30-second segments or phases for each of MAS units 100 and 101. A playback timing report is filed with the toll switching system processor 108 at the start of each announcement phase. This report identifies the announcement and the playback buffer where the message starts. Thus, if a request for an announcement occurs anytime during the 150-second interval shown in FIG. 4, processor 108 can select the MAS unit and buffer which contains the beginning of the message, and the customer will not have to wait longer than 15 seconds for the message to begin.

Disc unit 126 is under control of data/clock 210, disc control 211, and interface 209. Disc control 211 comprises a plurality of registers which are set to control the read/write heads and to select the cylinder and head addresses in addition to monitoring the status of the disc unit. Interface 209 provides the circuitry for controller 205 to transfer data to and from the disc unit 126. Interface 209 contains a first-in-first-out (FIFO) memory under control of a disc read/write sequencer. During a disc write, the interface performs parallel-to-serial data conversion and checks the data parity as the data is clocked to the disc by a servo clock which responds to the reading of the disc servo face mentioned above. During a disc read, the interface 209 performs serial-to-parallel data conversion and also performs an error check. The serial read data is assembled in the FIFO memory.

As shown in FIG. 2, each MAS unit includes record, playback, and update buffers 202, 203, and 204, respectively. The playback buffer 203 functions as a temporary store for the PCM announcement data read from the disc unit and continuously transmitted to the TSI unit over the DS-120 channels assigned to playback. In the illustrative embodiment, the buffer consists of a random access memory 212 organized in 64 buffers of 256 words each, interleaved as shown in FIG. 2. Each buffer word consists of two 8-bit bytes (DS-120 words) plus a parity bit for each byte. The words are accessed by reading each 64-word data block twice, with alternate bytes selected by multiplexer 200. Therefore, each 64-word data block provides two frames of playback data.

The record buffer 202 in FIG. 2 is a similar type memory for temporary storing 8-bit PCM data from the TSI unit prior to recording the data on the allocated disc sector. Operation of the record buffer is similar to the playback buffer. The input data from the DS-120 interface is written into the record buffer in synchronism with the playback buffer read process. The record buffer consists of 16 memory buffers of 256 words each interleaved in the same manner as the playback buffer shown in FIG. 2.

As mentioned above, the DS-120 format consists of a serial bitstream at a rate of 8000 frames per second with 128 time slots (i.e. channels) per frame. Each time slot contains one 8-bit PCM data sample. Of the 128 time slots, 120 may be used for voice information, and 8 are reserved for maintenance data.

The interface between the TSI unit 115 and the record and playback buffers is via DS-120, interface 225, and data multiplexer/demultiplexer 200. The incoming serial bitstream from TSI 115 is converted to parallel and demultiplexed to separate the record channels from the unused channels. A signal is also extracted from the bitstream to synchronize the clock in MAS unit 101 and to detect and establish the DS-120 word and frame synchronization. The last bit in all but the last channel is uncomplemented to establish word synchronization while the fifth bit in the last channel indicates frame synchronization. Data multiplexer/demultiplexer 200 includes a counter which is incremented for each word to generate addresses for all read/write operations controlled by the DS-120 interface.

Each of the MAS units 100 and 101 also contains an update buffer, such as buffer 204 in FIG. 2, which cross-couples data and control signals between the two MAS units. Announcements are always initially recorded completely on one disc and then transferred via the local update buffer to the made disc unit. This can be done without disturbing the normal playback process of either unit. At start-up and during processing, interunit timing signals are exchanged between the two MAS units to provide a phase boundary signal between the two units which establishes and continuously verifies the 15-second offset between the announcements stored in the MAS units. The mate unit reads its local update buffer after a 15-second delay allowing it to write the data onto its own disc in synchronism with its own playback process.

DIRECT PRODUCER UPDATE

Although the present disclosure is concerned with updating announcements by having the producer dial directly over the network, announcements can be changed manually or through a voice storage system, an Operations Network Administration Center, or an Announcement Distribution System (not shown). With a voice storage system, a producer would update an announcement by entering the new message in the voice storage system. At the appropriate time, the voice storage system would route the call to the toll system having the announcement to be updated.

To assure that proper transmission characteristics are met, special transmission tests are performed by digital signal processor 219 and interface 220, shown in FIG. 2. Transmission tests are also performed when announcements are updated by the Operations Network Administration Center. Otherwise the update method is similar to a direct producer update.

A producer is provided with the mass announcement service through the process similar to establishing new service for a telephone customer. More specifically, a service order is initiated which describes the service parameters. The service order is implemented via the recent change process whereby administrative personnel make changes to the toll switching office data base to include the new announcement service. The new announcement will be identified in the data base by the MAS unit number and announcement number. Also, entries will be made to designate the starting time of announcements since some announcements can be started as soon as possible while other announcements may start at some specified time. Furthermore, the memory associated with the announcement will indicate whether the producer can directly update messages, and the length of the message permitted will also be indicated. The memory will also contain indications as to the current status of announcements, that is, whether an announcement is "active" and playing back to callers or "standby" and is not yet playing back.

A description will now be given with reference to the block diagram of FIG. 1 of how a direct producer announcement update and verification is made. To assist the reader, reference will also be made to the flow diagrams of FIGS. 5-10 which depict the sequence of operation of the various equipment units.

Let it be assumed that station 106 is entitled to record announcements of 90-second duration and can directly update the announcement from the station. Also, let it be assumed that a 90-second announcement has already been recorded in MAS 101 and is actively playing back to customers dialing the directory number associated with the announcement, but the producer wishes to replace the existing announcement with a more up-to-date version. As shown in box 500, the producer begins by dialing a preassigned directory number for the announcement he wishes to update. The call is routed over the telephone network in the usual manner to the toll switching system 102 having the MAS unit wherein the announcement resides. At the toll office containing the MAS unit, a request for service is detected on the incoming trunk, and the called digits dialed by the producer are received as set forth in boxes 502 and 503. These digits are translated by central control 118 via a table lookup in call store 120, and the central control ascertains that the call is for updating a particular announcement. Central control 118 also ascertains from the announcement memory, as set forth in box 505, whether the announcement is updatable directly by the producer and, if not, the call is routed to reorder.

Assuming that the announcement is updatable, the central control 118 causes audible ringing to be returned over the incoming trunk to the producer. Central control 118 then times a short interval as shown in box 508 to assure that the calling producer is still offhook. After a sufficient time interval (approximately 7 seconds), central control 118 disconnects the audible ringing and causes a call progress tone to be transmitted to the calling producer. This tone informs the producer that his call is being processed and to wait until a tone is heard indicating when to begin transmitting the updated announcement.

At this time, central control 118 (FIG. 1) ascertains from the memory associated with the announcement whether or not an announcement update can be made. Thus, if an announcement is being updated and a call for a new update arrives at the toll office, the latter call will be rejected, a trouble report is made as shown in box 601, and the call will be routed to reorder. If no update is in progress, central control 118 ascertains the status of any standby recording. If a standby recording has to be replaced, an "abort recording" order is sent to MAS 101, and processor 108 progresses to ascertain the status of the disc memory as shown in boxes 605–607.

If there is no standby recording that has to be replaced, processor 108 ascertains if another set of disc sectors must be allocated. If a second set of disc sectors is needed, processor 108 ascertains if enough sectors are available and allocates the idle sectors as shown in boxes 605–607. Having allocated sufficient disc sectors, the announcement is marked "update in progress". The processor 108 now ascertains if there is an idle record channel.

As mentioned above, the disc storage 126 comprises 86 sectors of memory. Six sectors are dedicated for maintenance, 59 are available for active playback, and sectors not used for active audio are available for the storage of standby announcements. The sectors are dynamically assignable and reusable by central control 118 which maintains a busy/idle map of the disc sectors.

When a recent change order is processed by central control 118 to provide announcement service for a producer, central control 118 allocates sufficient playback channels and one set of disc sectors for the announcement depending on the length of the announcement (one playback channel and one disc sector for each 30 seconds of announcement time) and sends the appropriate peripheral orders to MAS 101. Thus, a recent change will not be executed unless there are enough available idle playback channels and one set of disc sectors.

An announcement may have a maximum of two sets of disc sectors allocated at any given time. One set is allocated for an active announcement and the other set for a standby announcement. If an announcement has one set of disc sectors allocated to an active message and a recording attempt is received, a second set of disc sectors will be seized from the pool of sectors that are idle at that time. In the event not enough sectors are available under the circumstances where too many standby messages are on file, a call from the producer will be routed to reorder.

Central control 118 examines its busy/idle map for sector allocation and determines that sufficient sectors are available for recording the standby message. Central control 118 then selects the idle sectors and sends a series of peripheral orders. The peripheral orders designate the MAS unit number, the sector, and the announcement identity. Having transmitted the sector allocation orders and updated the busy/idle map, central control 118 now ascertains if an idle record channel is available, as shown in decision box 610. If no record channel is available, the call is put in a queue which is periodically examined by central control 118 until the call can be completed. Assuming that an idle record channel is available, central control 118 ascertains if an idle network path is available. If there are no idle network paths, a second attempt to find a path is made before the call is routed to reorder. When a path is available, the path is reserved as shown in box 615 of the flow diagram, and central control 118 transmits an order to MAS 101 to record when ready. MAS 101 reports back (box 701) to central control 118 when it is ready to record, and central control 118 responds by disconnecting the cell progress tone and setting up a network path to the reserved record channel.

Once connected to the record channel, MAS 101 transmits signals to the producer informing the producer to begin transmitting the new version of the announcement message. This signal can comprise a tone of approximately ⅜-second duration or a suitable prerecorded or machine announcement instructing the producer when to begin and how long a message will be accepted followed by a tone to indicate the beginning of the announcement or any other suitable signal.

MAS 101 then begins timing the message to assure that the complete disc sector is written over in order to erase any prior announcement stored therein. The MAS unit having timed equivalent to one disc sector ascertains if additional disc sectors have been allocated for this announcement and continues timing until all disc sectors have been utilized. This is to assure that all the disc sectors allocated for the announcement have been written over or erased for the new message. When the last disc sector has been used, MAS 101 transmits a "recording complete" report, as shown in box 708, to the central control 118 of the toll switching system.

In response to the report back, central control then reconnects call progress tone to the trunk, as shown in box 800, and times for 10 seconds after which it examines the incoming trunk to ascertain if the producer is still offhook. If the producer has disconnected, central control 118 interprets this as an indication that the recording was made in error. Central control 118 then sends an "abort recording" order to the MAS unit 101 and the recording is removed. Central control 118 updates the announcement status memory to indicate that there is no standby announcement in the disc memory.

Assuming that the producer is still offhook, central control 118 interprets this as an acknowledgement that the producer has not aborted the call for the updated announcement that has just been recorded. Central control 118 then sends a disconnect signal over the incoming trunk and marks the announcement memory "standby full", as shown in box 805, after which the announcement is put in a verification queue so that the announcement can be verified. Central control then sends a message to MAS 101 to request that the announcement be duplicated in MAS 100 and exits this portion of the program.

ANNOUNCEMENT VERIFICATION

As mentioned above, and in accordance with a feature of the invention, verification of announcement updates will be made by directly calling the producer using a preassigned number which has been stored in the toll switching system memory. This assures that a new announcement will not be inadvertently made active without verifying that the announcement had been recorded by an authorized producer.

Periodically, central control 118 examines its various queues in call store 120 under the control of a task dispenser program to ascertain work that has to be performed. Central control 118 first assigns a call register to the task and then ascertains if an announcement monitor channel is available. As noted above, a maximum of 14 of the DS-120 channels are available for either playback or monitoring standby announcements, and this number is specified in the toll switching office data base. If none of the channels are available, the call is put back in a queue and retried later.

Assuming that a monitor channel is available, the channel is reserved and central control 118 goes to the announcement memory to ascertain the producer's directory number, as shown in box 904. Using the directory number, central control 118 translates this into routing information and selects an idle outgoing trunk. Once an idle outgoing trunk has been selected, a network path is reserved between the monitor channel and the outgoing trunk. The producer's directory number is then outpulsed over the connection, as depicted by box 908, and the call is routed via the telephone network in a conventional manner to the producer's station.

Central control 118 now times for 60 seconds and interrogates the outgoing trunk to ascertain if the producer has answered the call. If no answer has been received, central control 118 puts the call back into the queue. Later, central control 118 unloads the queue, another outgoing trunk is selected, and the producer's directory number is transmitted over the new trunk. Four call-back attempts are made in this manner and, if no answer is returned from the producer's station, a trouble report is made to the maintenance personnel. The updated announcement remains on standby and an attempt is made to manually verify the message from the operations network administration center or the maintenance center.

Let it be assumed, however, that one of these call-back attempts is successful and answer supervision is returned from the local office serving producer's station, as set forth in the yes branch of decision box 910. Central control 118 connects call progress tone to the outgoing trunk and sends a peripheral order, as shown in box 1001, to MAS 101 to play back the standby announcement.

MAS 101 responds with a "playback started" report and central control 118 disconnects the call progress tone and sets up a network path between the outgoing trunk and the monitor channel.

While the standby announcement is being played back to the producer for verification, central control 118 is monitoring the outgoing trunk to ascertain if the producer is still offhook. Should the producer hang up before the end of the play back of this message, central control 118 will send a "stop playback" and an "abort announcement" message to MAS 101 to assure that the standby message is not activated and that the standby message is considered removed. The network connection to the trunk is then disconnected.

Assuming that the producer is still offhook and has not rejected the standby message, central control 118 connects call progress tone to the trunk for 10 seconds. If the producer remains offhook during this interval, central control 118 marks the announcement verified, and a disconnect signal is sent to the outgoing trunk. At the appropriate start-up time, central control 118 sends an "activate" order to MAS unit 101. The "activate" order is interpreted by MAS unit 101 to remove the announcement from the standby state and place it in the active state. During this process, any customer already connected to an announcement will continue hearing the old announcement to its completion, but if the caller is to hear multiple plays, the next play will be the updated version. New calls will be connected to the updated version.

Had the producer disconnected before the toll switching system had disconnected, central control 118 considers this a rejection of the standby announcement by the producer and transmits an "abort announcement" order to MAS unit 101.

In summary, a public announcement system has been described wherein announcements may be recorded and updated via a telephone network, and wherein updated announcements are verified by calling the producer at a predesignated station to permit the producer to accept or reject the updated version of the message.

It will be understood, of course, that the arrangement described in the foregoing is merely illustrative of the application of the principles of the present invention, and numerous other arrangements may be utilized by those skilled in the art without departing from the spirit and scope of the invention.

What is claimed is:

1. For use in a telephone network having announcement equipment for storing recorded announcements for transmittal over the network and a switching office for selectively interconnecting telephone stations with said equipment, a machine method operative from one of said stations for updating a particular stored one of said recorded announcements comprising the steps of
   transmitting a new standby announcement over a first connection to said announcement equipment,
   upon receipt of said standby announcement establishing a second connection from said office to a station designated by said office for verification of the standby announcement,
   retransmitting said standby announcement over said second connection in response to a signal from said designated station, and
   replacing the particular stored announcement with the standby announcement in the event the switching office interrupts the second connection before a second signal is received from said designated station.

2. The method defined in claim 1 wherein the step of transmitting comprises the step of establishing a telephone connection from a calling telephone station to the announcement equipment, and wherein the method further comprises the steps of
   ascertaining from the switching office whether updating from the calling station of the particular stored announcement is permissible,
   allocating sufficient spare memory for recording the new standby announcement if updating is permissible, and
   recording the new standby announcement in the allocated memory.

3. The method defined in claim 2 wherein the step of ascertaining whether updating is permissible includes the steps of determining whether another standby announcement has been priorly recorded in said equipment.

4. The method defined in claim 2 wherein the step of recording the new standby announcement comprises the step of recording over the entire allocated memory independently of the length of new announcements.

5. The method defined in claim 1 further comprising the step of examining a memory at the switching office to ascertain the identity of the station designated for verification.

6. The method defined in claim 1 further comprising the steps of periodically monitoring the second connection for the presence of the second signal during the retransmittal of the standby announcement, and monitoring the second connection for the presence of the second signal for a predetermined interval after the retransmittal of the standby announcement.

7. For use in a telephone network having announcement equipment for storing recorded announcements for transmittal over the network and a switching office for selectively interconnecting telephone stations with said equipment, a method for assuring that announcement updates are verified only by authorized telephone stations comprising the steps of dialing from a calling station a telephone number associated with a particular one of the announcements stored in a first memory, establishing a first connection between the calling station and the announcement equipment, transmitting the update announcement from the calling station over the first connection, recording the update announcement in a second memory, ascertaining independently of said calling station the identity of a station designated for verification of the update announcement, establishing a second connection to the designated station, playing back the standby announcement over the second connection to the designated station, monitoring the second connection for a station disconnect signal during the playback, and activating the second memory and deactivating the first memory if said disconnect signal is not received within a prescribed interval.

* * * * *